United States Patent [19]

Shekelton et al.

[11] Patent Number: 5,058,375
[45] Date of Patent: Oct. 22, 1991

[54] GAS TURBINE ANNULAR COMBUSTOR WITH RADIAL DILUTION AIR INJECTION

[75] Inventors: Jack R. Shekelton, San Diego; Douglas C. Johnson, Corona, both of Calif.

[73] Assignee: Sundstrand Corporation, Rockford, Ill.

[21] Appl. No.: 541,489

[22] Filed: Jun. 21, 1990

Related U.S. Application Data

[63] Continuation of Ser. No. 291,041, Dec. 28, 1988, abandoned.

[51] Int. Cl.$^5$ .............................................. F02C 3/05
[52] U.S. Cl. ...................................... 60/39.36; 60/760
[58] Field of Search .................... 60/39.36, 760, 758, 60/748

[56] References Cited

U.S. PATENT DOCUMENTS

| | | | |
|---|---|---|---|
| 2,595,505 | 5/1952 | Bachle | 60/39.36 |
| 2,916,878 | 12/1959 | Wirt | 60/759 |
| 2,924,937 | 2/1960 | Leibach | 60/39.36 |
| 2,930,194 | 3/1960 | Perkins . | |
| 2,946,192 | 7/1960 | Hambling . | |
| 2,977,760 | 4/1961 | Soltau et al. . | |
| 3,088,279 | 5/1963 | Diedrich . | |
| 3,116,908 | 1/1964 | Wosika | 60/39.36 |
| 3,228,190 | 1/1966 | Brown . | |
| 3,266,250 | 8/1966 | Freeman et al. | 60/39.36 |
| 3,287,905 | 11/1966 | Bayard | 60/760 |
| 3,321,912 | 5/1967 | Oprecht | 60/39.36 |
| 3,381,471 | 5/1968 | Szydlowski . | |
| 3,383,855 | 5/1968 | Freeman et al. | 60/760 |
| 3,465,518 | 9/1969 | Erwin . | |
| 3,613,360 | 10/1971 | Howes | 60/39.36 |
| 3,670,497 | 6/1972 | Sheldon . | |
| 4,018,043 | 4/1977 | Clemmens | 60/760 |
| 4,100,732 | 7/1978 | Bryans et al. . | |
| 4,151,709 | 5/1979 | Melconian et al. | 60/39.36 |
| 4,263,780 | 4/1981 | Stettler . | |
| 4,296,599 | 10/1981 | Adamson . | |
| 4,429,527 | 2/1984 | Teets . | |
| 4,462,204 | 7/1984 | Hull . | |
| 4,541,774 | 9/1985 | Rieck et al. . | |
| 4,573,315 | 3/1986 | Stroem . | |

FOREIGN PATENT DOCUMENTS 226308  7/1943  Switzerland .......................... 60/760

*Primary Examiner*—Louis J. Casaregola
*Assistant Examiner*—Timothy S. Thorpe
*Attorney, Agent, or Firm*—Wood,Phillips,Mason,Recktenwald & VanSanten

[57] ABSTRACT

An annular combustor having radial dilution air injection in a gas turbine is disclosed. The gas turbine includes a rotor having turbine blades and a nozzle adjacent the turbine blades which is adapted to direct hot gases at the turbine blades to cause rotation of the rotor. The annular combustor is disposed about the rotor and has an outlet to the nozzle, spaced inner and outer walls, and a generally radially extending wall connecting the inner and outer walls. The gas turbine includes a housing substantially surrounding the annular combustor in spaced relation to the inner, outer and radially extending walls to define a dilution air flow path. The dilution air flow path includes a compressed air inlet in communication with a compressor supplying dilution air at one end thereof and a compressed air outlet in communication with the annular combustor adjacent the outlet at the other end thereof. With this arrangement, the dilution air flow path extends substantially entirely about the annular combustor to cool the inner, outer and radially extending walls thereof.

9 Claims, 2 Drawing Sheets

GAS TURBINE ANNULAR COMBUSTOR WITH RADIAL DILUTION AIR INJECTION

This application is a continuation, of application Ser. No. 291,0941, filed Dec. 28, 1988 now abandoned.

FIELD OF THE INVENTION

This invention relates to gas turbine annular combustors and, more particularly, to an annular combustor having radial swirling, circumferentially uniform, dilution air injection.

BACKGROUND OF THE INVENTION

It has long been known in gas turbines to provide a dilution air zone in the combustor immediately downstream of the flame zone. The dilution air zone is conventionally located directly within the combustion annulus downstream of the fuel injectors but well upstream of the outlet of the combustor. Generally speaking, dilution air is injected into the combustion annulus defining the flame zone to control the temperature of hot gases.

More specifically, upstream of the dilution zone both fuel and air are injected and ignited in the combustion annulus. It is also conventional for there to be a cooling air film introduced along the walls of the combustion annulus upstream of the dilution zone. Of course, the hot gases that result from combustion of fuel and air then pass toward turbine blades.

As is known, it is important to be able to control the temperature of the hot gases as they enter the nozzle on their way to the turbine blades. This has conventionally been handled by injecting dilution air into the hot gases well upstream of the outlet of the combustor in order to ensure thorough mixing and cooling prior to entry into the nozzle. While effective, this means of controlling the temperature of the hot gases is not satisfactory in every respect.

More particularly, the need to provide the dilution zone in the combustion annulus upstream of the outlet of the combustor tends to dictate the geometry. In other words, the length of the turbine is controlled to a significant degree by the necessity of having a distinct dilution zone within the combustion annulus, i.e., there has been no available manner for satisfactorily shortening the length of the combustor in order to reduce weight and expense. However, conventional designs have also failed to address still another serious problem recognized by those in this field.

In particular, the dilution air flow path is known to cool only a portion of the walls of the combustor. Thus, in a conventional annular combustor of a gas turbine, not only is it true that not all portions of the walls of the combustor are cooled by the dilution air, but the point of injection into the dilution zone has rendered it impossible to effect any significant cooling of the turbine shroud and, thus, of the nozzle and turbine blades. As a result, it has remained to provide a low cost, simple, reliable means of turbine shroud cooling.

As will be appreciated, these problems lead to adverse consequences relative to performance and life span. In other words, due to the heretofore recognized inability to provide an ultra-short combustor and a well-cooled turbine shroud, it has been impossible to achieve the levels of power and fuel economy as well as longer life for the various components such as the nozzle blades, turbine shroud, turbine blades, turbine exhaust duct, etc. Furthermore, if an ultra-short combustor could be provided, there would be less exhaust noise thereby reducing silencing problems.

The present invention is directed to overcoming the above-stated problems by providing a unique gas turbine annular combustor with radial swirling, circumferentially uniform, dilution air injection in a radial flow turbine While the invention has been described in connection with a radial flow turbine, it should be appreciated that the invention could be utilized with any gas turbine construction.

SUMMARY OF THE INVENTION

It is a principal object of the invention to provide a new and improved annular combustor for a radial flow gas turbine or any other gas turbine construction. More specifically, it is an object of the invention to provide such a combustor wherein swirling, circumferentially uniform, dilution air is injected radially downstream of the combustion annulus. Furthermore, it is an object of the invention to provide for mixing of dilution air with hot gases in a zone or area of reduced cross section and of reduced volume.

An exemplary embodiment of the invention achieves the foregoing objects in a gas turbine including a rotor having turbine blades and a nozzle adjacent the turbine blades which is adapted to direct hot gases at the turbine blades to cause rotation of the rotor. The gas turbine includes an annular combustor about the rotor having an outlet to the nozzle, and defined by spaced inner and outer walls and a generally radially extending wall connecting the inner and outer walls. The gas turbine also includes a housing substantially surrounding the annular combustor in spaced relation to the inner, outer and radially extending walls to define a dilution air flow path. More particularly, the dilution air flow path includes a compressed air inlet in communication with a compressor supplying dilution air at one end thereof and a compressed air outlet in communication with the annular combustor adjacent the outlet at the other end thereof.

With this arrangement, the dilution air flow path extends substantially entirely about the annular combustor to cool the inner, outer and radially extending walls thereof. It is also contemplated that the annular combustor will include a combustion annulus defined by the respective walls upstream of the outlet. When so formed, the compressed air outlet is in communication with the annular combustor downstream of the combustion annulus closely adjacent the nozzle.

In the preferred embodiment, the dilution air flow path extends first along the outer wall and then along the radially extending wall and finally along the inner wall of the annular combustor. The compressed air outlet is positioned at the end of this flow path so as to direct dilution air into a dilution air annulus disposed between the combustion annulus and the nozzle in the outlet of the combustor. Preferably, the dilution air annulus is not only disposed downstream of the outlet of the combustor but also comprises an area of reduced cross sectional area in relation to the much larger cross sectional area of the combustion annulus.

More specifically, the compressed air outlet advantageously directs the dilution air from the dilution air flow path in a direction generally back toward the compressed air inlet. It will be appreciated that this is a radially outwardly directed injection of the dilution air toward the outer wall and across or generally parallel to the outlet of the annular combustor which helps achieve thorough mixing and cooling of the hot gases from the combustion annulus moving at generally a right angle thereto. Preferably, mixing and cooling of dilution air and hot gases in the dilution zone is enhanced by utilizing means for inducing swirl into the dilution air such as stand-off swirl vanes.

Other objects, advantages and features of the present invention will become apparent from a consideration of the following specification taken in conjunction with the accompanying drawings.

DETAILED DESCRIPTION OF THE PREFERRED EMBODIMENT

Figure 1:
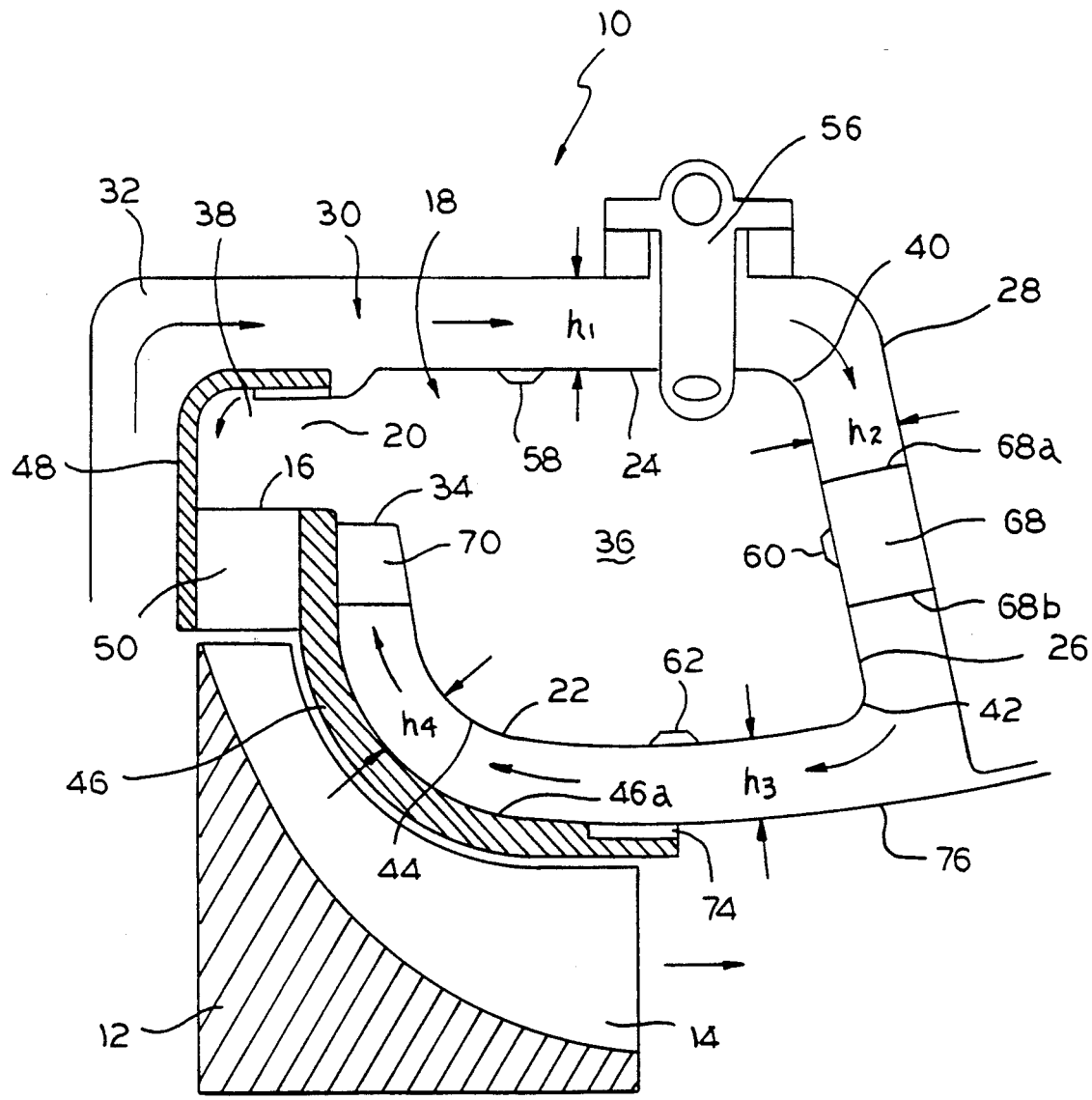
FIG. 1 is a somewhat schematic, fragmentary, sectional view of a gas turbine constructed in accordance with the present invention.

An exemplary embodiment of a gas turbine constructed in accordance with the invention is illustrated in the drawing. However, the invention is not so limited, having applicability to any form of turbine or other fuel combusting device requiring an annular combustor.

Referring to the drawings, the reference numeral 10 designates generally a gas turbine shown herein for illustration purposes as being of the radial flow type and having a rotor 12 with turbine blades 14 and a nozzle 16 adapted to direct hot gases at the turbine blades 14 to cause rotation of the rotor 12. In addition, the gas turbine 10 includes an annular combustor generally designated 18 about the rotor 12 and having an outlet 20 to the nozzle 16, spaced inner and outer walls 22 and 24, respectively, and a generally radially extending wall 26 connecting the inner and outer walls 22 and 24.

A housing 28 substantially surrounds the annular combustor 18 in spaced relation to the inner, outer and radially extending walls 22, 24 and 26, respectively, to define a dilution air flow path generally designated 30. The dilution air flow path 30 includes a compressed air inlet as at 32 in communication with a compressor (not shown) supplying air at one end thereof and a compressed air outlet 34 in communication with the annular combustor 18 adjacent the outlet 20 at the other end thereof. As will be seen, the dilution air flow path 30 extends substantially entirely about the annular combustor 18 to cool the inner, outer and radially extending walls 22, 24 and 26, respectively.

Moreover, the dilution air flow path 30 extends first along the outer wall 24 and then along the radially extending wall 26 and finally along the inner wall 22 of the annular combustor 18 (see the arrows showing the direction of flow).

As will be appreciated, the annular combustor 18 includes a combustion annulus 36 defined by the inner, outer and radially extending walls 22, 24 and 26, respectively. This combustion annulus 36 is disposed upstream of the outlet 20 of the annular combustor 18 and, as a result, the compressed air outlet 34 is in communication with the annular combustor 18 downstream of the combustion annulus 36 closely adjacent the nozzle 16. Furthermore, as shown, a hot and cold annulus 38 is disposed between the combustion annulus 36 and the nozzle 16 in the outlet region of the annular combustor 18.

In other words, the outlet 20 of the annular combustor 18 leads to the nozzle 16 through the annulus 38. Thus, all of the hot gases exiting from the combustion annulus 36 pass through the annulus 38 where dilution air is injected into the hot gases from the compressed air outlet 34 prior to entry of the hot gases into the nozzle 16. For this reason, the hot gases are cooled by and mixed with the dilution air thoroughly thereby protecting the downstream components.

As shown in the drawings, the dilution air flow path 30 defines what could accurately be termed a near closed loop although it is not a closed loop in the true sense of the word since the compressed air outlet 34 is spaced from the outer wall 24. Nevertheless, the configuration defined by the inner, outer and radially extending walls 22, 24 and 26, respectively, does include bends as at 40, 42 and 44 which help to define the near closed loop configuration of the dilution air flow path 30 which extends substantially entirely about the large combustion annulus 36. As for the combustion annulus 36, it leads in a downstream direction to the outlet 20 which is greatly reduced in cross sectional area relative thereto and the compressed air outlet 34 directs the dilution air radially outwardly toward the outer wall 24 and across the outlet 20 of the annular combustor 18.

As previously mentioned, the dilution air flow path 30 extends from the compressed air inlet 32 substantially entirely about the combustion annulus 36 to the compressed air outlet 34. It will be seen from the drawing that the compressed air inlet 32 and compressed air outlet 34 are at remote ends of the dilution air flow path 30, although the compressed air outlet 34 does in fact direct dilution air from the flow path in a direction generally toward the compressed air inlet 32 by reason of the nearly closed loop path followed by the dilution air. With the arrangement illustrated in the drawings, as much as approximately 40% of the total combustor air flow enters at the compressed air outlet 34.

In another manner of speaking, the compressed air outlet 34 advantageously directs the dilution air from the dilution air flow path 30 in a direction generally back toward the compressed air inlet 32. It will be appreciated that this is a radially outwardly directed injection of the dilution air toward the outer wall 24 and across or generally parallel to the outlet 20 of the annular combustor 18 which helps achieve thorough mixing and cooling of the hot gases from the combustion annulus 36 moving at generally a right angle thereto. Preferably, mixing and cooling of dilution air and hot gases in the dilution zone is enhanced by utilizing means for inducing swirl into the dilution air as will be described in greater detail hereinafter.

As shown in the drawings, the housing 28 preferably also includes a pair of spaced apart turbine nozzle shrouds 46 and 48 covering the turbine blades 14 and nozzle blades 50 in the nozzle area 16. These turbine nozzle shrouds 46 and 48, together with the remainder of the housing 28 and the inner, outer and radially extending walls 22, 24 and 26, respectively, define the entirety of the dilution air flow path 30 in the preferred embodiment. As will be appreciated, a portion of the dilution air flow path 30 extends along at least a portion of at least one of the turbine nozzle shrouds 46.

More specifically, the dilution air preferably follows a path completely along the turbine nozzle shroud 46. Thus, as the dilution air leaves the compressor on its way to the compressed air inlet 32 and continues along the dilution air flow path 30, it eventually passes over the surface 46a of the turbine nozzle shroud 46 prior to exiting the dilution air flow path at the compressed air outlet 34. In this manner, the turbine nozzle shroud 46 is subjected to cooling by reason of the path of the dilution air.

As shown in the drawing, the annular combustor 18 will preferably include a plurality of radially disposed fuel injectors 56 which can be conventional and serve to spray a fuel/air mixture into the combustion annulus 36 in a tangential direction where it will be burned to produce the hot gases. It is these gases that are mixed with the dilution air in the annulus 38 prior to entry into the nozzle 16 and contact with the nozzle blades 50 and the turbine blades 14. Furthermore, the gas turbine 10 may include small openings as illustrated schematically, for instance, at 58, 60 and 62 to bleed air into the combustion annulus 36 to produce a localized cooling air film on the inwardly facing surfaces of the inner, outer and radially extending walls 22, 24 and 26, respectively.

Figure 2:
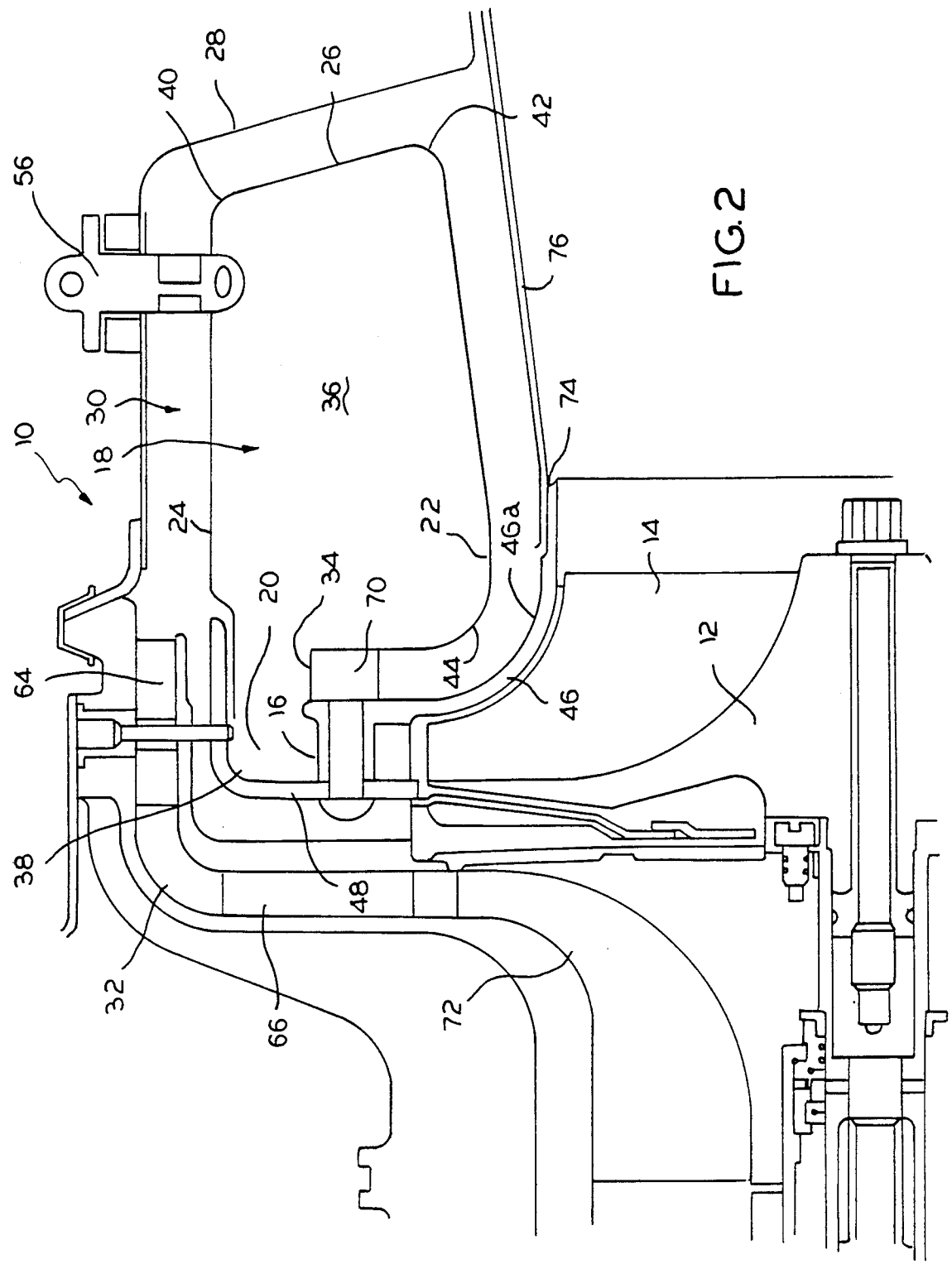
FIG. 2 is a somewhat schematic, fragmentary, sectional view of another gas turbine constructed in accordance with the present invention.

In the embodiment illustrated in FIG. 2, deswirl vanes 64 are used to control the swirl of air from diffuser 66. Typically, this swirl of air might be 35 more or less and, at high velocity, the swirl of air is effective in providing external convective cooling to the outer wall 24 of the combustor 36. As will be appreciated, such cooling can supplement or replace film cooling of the wall 24.

Swirl vanes 68, whose leading edge 68a is coincident with the annulus swirl so that the swirl of air may smoothly pass over vanes 68, may have their trailing edge 68b set to increase or decrease the swirl of air (see FIG. 1). This will, in turn, increase or decrease the cooling of the combustor walls downstream of the vanes 68. When used, such vanes 68 may be put at any appropriate point in the dilution air flow path 30 so as to permit an optimization of the swirl cooling of the walls.

Similarly, vanes 70 will be coincident at their leading edge with the entry swirl of air but may have their trailing edge likewise coincident so as to effect no change in mixing of swirl air and hot gas or adjusted to increase or decrease swirl so as to achieve more mixing or less mixing, respectively.

In many instances, the swirl of air as established by the deswirl vanes 64 (FIG. 2) may suffice to provide the cooling and mixing required without additional swirl modification. In this case, the vanes 68 (FIG. 1) may well be deleted. Furthermore, the vanes 70 would then serve as spacers to effect accurate control of the compressed air outlet 34 by serving to assure a uniform and consistent supply of air at the outlet.

With an increase in swirl as can be effected by designing the deswirl vanes 64 to lessen the degree of deswirl, the high swirl (typically 60° more or less) from the diffuser 66 would result in an increase of cooling of the walls and an increase in mixing of hot gas and cool air. There would be, however, an increased pressure loss. Therefore, it will be appreciated from the foregoing that adjustment of swirl of air, by practices well known to those familiar with the art and as mentioned herein, is a matter of judgment in trading off between pressure drop and mixing and cooling.

Likewise, the high swirl of air from the diffuser 66 is modified by the design of the compressor 72 and the vanes of the diffuser 66 so that in some instances no deswirl vanes 64 are needed and vanes 70 serve only as spacers.

Also, cooling of air is increased by increases in air velocity which suggests adjusting the annulus heights $h_1$, $h_2$, $h_3$, $h_4$ downward to increase cooling. However, this is done at a price of increased pressure drop. Thus, these height adjustments provide additional means of precise tailoring of local cooling of combustor walls as required.

By reason of the unique swirl cooling and dilution air mixing, the annular combustor 18 can be formed to have far less length than in a conventional combustor. It will also be appreciated that the turbine nozzle shroud 46 is well cooled by the design of the present invention which achieves much higher power and greater fuel economy than for comparable gas turbines. In essence, the dilution zone of a conventional combustor has been entirely eliminated by locating it between the outlet 20 of the combustor 18 and the nozzle 16.

By so doing, the annular combustor 18 is shorter, lighter and less expensive resulting in reduced exhaust noise to thereby eliminate silencing problems normally encountered. The annular combustor 18 is also well cooled because of its reduced surface area and higher convective cooling and the turbine nozzle shroud 46 is similarly well cooled which permits much closer tolerances for higher turbine efficiency and reduced fuel consumption, and the more uniform temperatures in the shroud assembly result in longer life. Furthermore, the nozzle blades 50, turbine blades 14, nozzle/exhaust duct seal 74 and exhaust duct 76 are all maintained at lower temperatures to ensure a longer life.

Finally, the dilution air is preferably a high swirl flow, e.g., up to approximately 80°, at high Mach Nos., e.g. 0.2, as it passes through the dilution air flow path 30. The dilution air is thus injected while swirling at high Mach Nos. immediately upstream of the nozzle 16 and, due to the high pre-swirl, it is possible to use shorter, better cooled nozzle blades 50. Also, due to the high Mach Nos., it is possible to utilize larger, less expensive openings 58, 60 and 62 for the introduction of film air due to the lower value of $C_d$.

While in the foregoing there has been set forth a preferred embodiment of the invention, it will be understood that the details herein given are for purposes of illustration and the invention is only to be limited by the spirit and scope of the appended claims.

We claim:

1. A radial flow gas turbine, comprising:
   a rotor including turbine blades and a nozzle adjacent said turbine blades, said nozzle being adapted to direct hot gases at said turbine blades to cause rotation of said rotor;
   an annular combustor about said rotor and having a combustor outlet leading to said nozzle, said annular combustor having spaced inner and outer walls connected by a generally radially extending wall, said annular combustor including a combustion annulus defined by said inner, outer and radially extending walls upstream of said outlet;
   a dilution air annulus disposed downstream of said combustion annulus and immediately radially outwardly of said nozzle axially adjacent to and immediately downstream of said combustor outlet of said annular combustion; and
   a housing substantially surrounding said annular combustor in spaced relation to said inner, outer and radially extending walls thereof, said housing and walls together defining at least a portion of a dilution air flow path having a compressed air inlet in communication with a compressor for supplying dilution air at one end thereof, a turbine nozzle shroud and said inner wall defining the remainder of said dilution air flow path, said turbine nozzle shroud and said inner wall having axially spaced apart ends adjacent said nozzle defining a compressed air outlet, said compressed air outlet being in communication with said annular combustor axially adjacent to and immediately upstream of said combustor outlet at the other end of said dilution air flow path, said dilution air flow path extending substantially entirely about said annular combustor in a nearly closed loop to cool said inner, outer and radially extending walls;

said compressed air outlet injecting dilution air directly a ross said combustor outlet toward said compressed air inlet, said illusion air being injected into said hot gases at generally a right angle thereto assist hot gases approach said combustor outlet, said compressed air outlet being in communication with said dilution air annulus directly through said combustor outlet of said annular combustor downstream of said combustion annulus.

2. The gas turbine as defined in claim 1 wherein said dilution air flow path extends first along said outer wall and then along said radially extending wall and finally along said inner wall of said annular combustor.

3. A radial flow gas turbine, comprising:

a rotor including turbine blades and a nozzle adjacent said turbine blades, said nozzle being adapted to direct hot gases at said turbine blades to cause rotation of said rotor;

an annular combustor about said rotor defined by spaced inner and outer walls connected by a generally radially extending wall, said annular combustor having a combustor a outlet leading to said nozzle, said annular combustor also including a combustion annulus defined by said inner, outer and radially extending walls upstream of said outlet;

a dilution air annulus disposed downstream of said combustion annulus and immediately radially outwardly of said nozzle axially adjacent to and immediately downstream of said combustor outlet of said annular combustor; and a housing substantially surrounding said annular combustor in spaced relation to said inner, outer and radially extending walls thereof and together with a turbine nozzle shroud defining a dilution air flow path extending from a compressed air inlet to a compressed air outlet, said compressed air inlet being in communication with a source of dilution air and said turbine nozzle shroud and said inner wall having axially spaced apart ends adjacent said nozzle to define said compressed air outlet such that said compressed air outlet is in communication with said annular combustor axially adjacent to and immediately upstream of said combustor outlet at the end of said dilution air flow path remote from said compressed air inlet, said dilution air flow path extending first between said housing and said outer wall and then between said housing and said radially extending wall, and then between said housing and said inner wall, and finally between said turbine nozzle shroud and said inner wall of said annular combustor;

said dilution air flow path extending from said compressed air inlet substantially entirely about said combustion annulus to said compressed air outlet in a nearly closed path, said compressed air outlet injecting dilution air directly across said combustor outlet toward said compressed air inlet, said dilution air being injected into said hot gases at generally a right angle thereto as said hot gases approach said combustor outlet, said compressed air outlet being in communication with said dilution air annulus directly through said combustor outlet of said annular combustor downstream of said combustion annulus.

4. The gas turbine as defined in claim 3 wherein said compressed air outlet directs said dilution air radially outwardly toward said outer wall and across said outlet of said annular combustor.

5. A radial flow gas turbine, comprising:

a rotor including turbine blades and a nozzle adjacent said turbine blades, said nozzle being adapted to direct hot gasses at said turbine blades to cause rotation of said rotor, said nozzle including nozzle blades radially outward of said turbine blades;

an annular combustor about said rotor and having a combustor outlet leading to said nozzle, said annular combustor having spaced inner and outer walls connected by a generally radially extending wall, said annular combustor including a combustion annulus defined by said inner, outer and radially extending walls upstream of said outlet;

a dilution air annulus disposed downstream of said combustion annulus and immediately radially outwardly of said nozzle axially adjacent o and immediately downstream of said combustor outlet of said annular combustor; and a housing substantially surrounding said annular combustor in spaced relation to said inner, outer and radially extending walls thereof, said housing including a pair of spaced apart turbine nozzle shrouds covering said turbine blades and said nozzle blades and, together with the remainder of said housing and said inner, outer and radially extending walls of said annular combustor, defining a dilution air flow path including a compressed air inlet in communication with a compressor supplying dilution air at one end thereof and a compressed air outlet in communication with said annular combustion axially adjacent to and immediately upstream of said combustor outlet at the other end thereof, said dilution air flow path extending substantially entirely about said annular combustor in a nearly closed path to cool said inner, outer and radially extending walls thereof;

said inner wall and one of said turbine nozzle shrouds having axially spaced apart ends adjacent said nozzle defining said compressed air outlet;

said compressed air outlet injecting dilution air directly across said combustor outlet toward said compressed air inlet, said dilution air being injected into said out gases at generally a right angle thereto as said hot gases approach said combustor outlet, said compressed air outlet being in communication with said dilution air annulus directly through said combustor outlet of said annular combustor downstream of said combustion annulus.

6. The gas turbine as defined in claim 5 wherein said dilution air flow path extends first along said outer wall and then along said a radially extending wall and finally along said inner wall of said annular combustor.

7. The gas turbine as defined in claim 5 wherein said dilution air annulus is an area of reduced cross sectional area in relation to the cross sectional area of said combustion annulus.

8. The gas turbine as defined in claim 5 including means for inducing swirl into said dilution air for mixing with said hot gases directed toward said turbine blades by said nozzle blades.

9. The gas turbine as defined in claim 8 wherein said swirl inducing means includes stand off swirl vanes in said compressed air outlet.

* * * * *